T. H. CLEATHERO.
VEHICLE JACK AND TURN TABLE.
APPLICATION FILED NOV. 26, 1915.

1,261,703.

Patented Apr. 2, 1918.
5 SHEETS—SHEET 1.

Witnesses—
Lionel Ernest Bussey
Samuel Greenberg

Inventor,
Thomas Henry Cleathero,
by
W. S. Evans
Attorney.

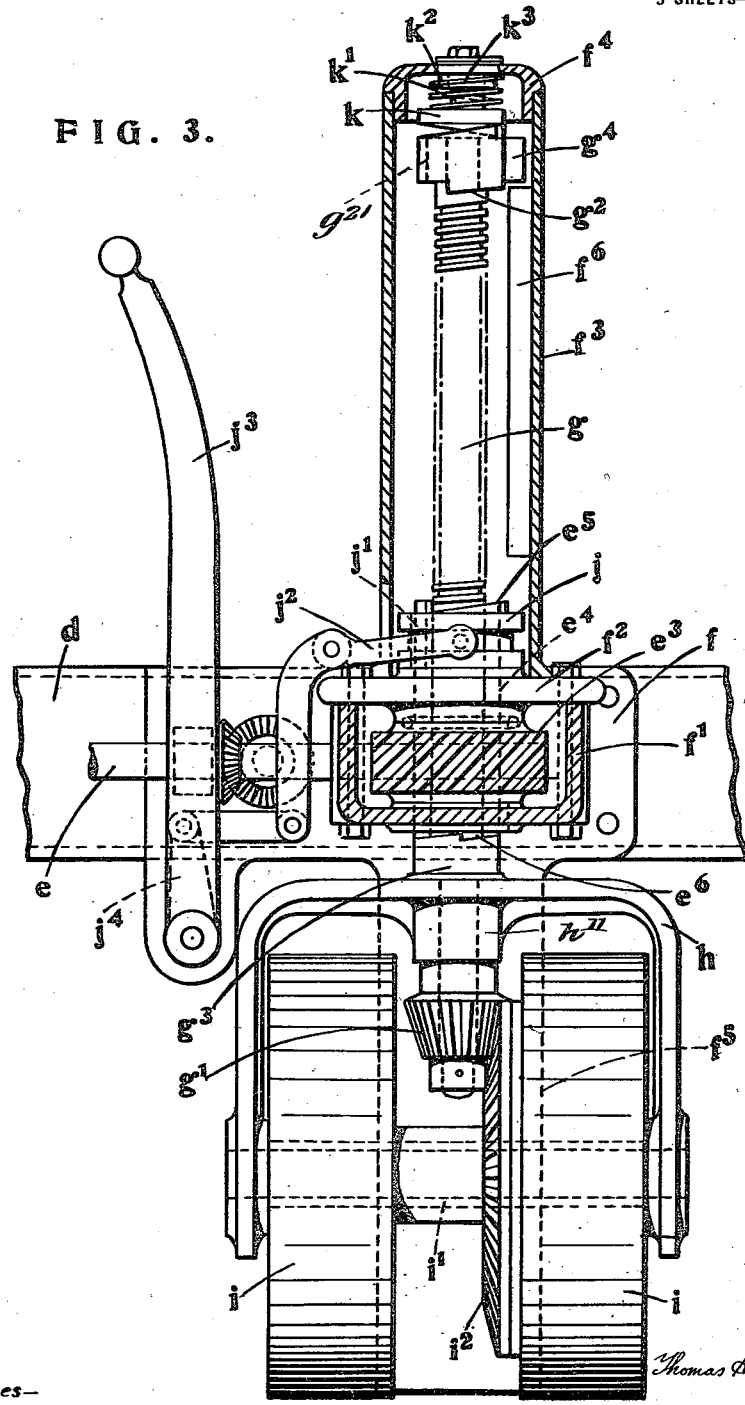

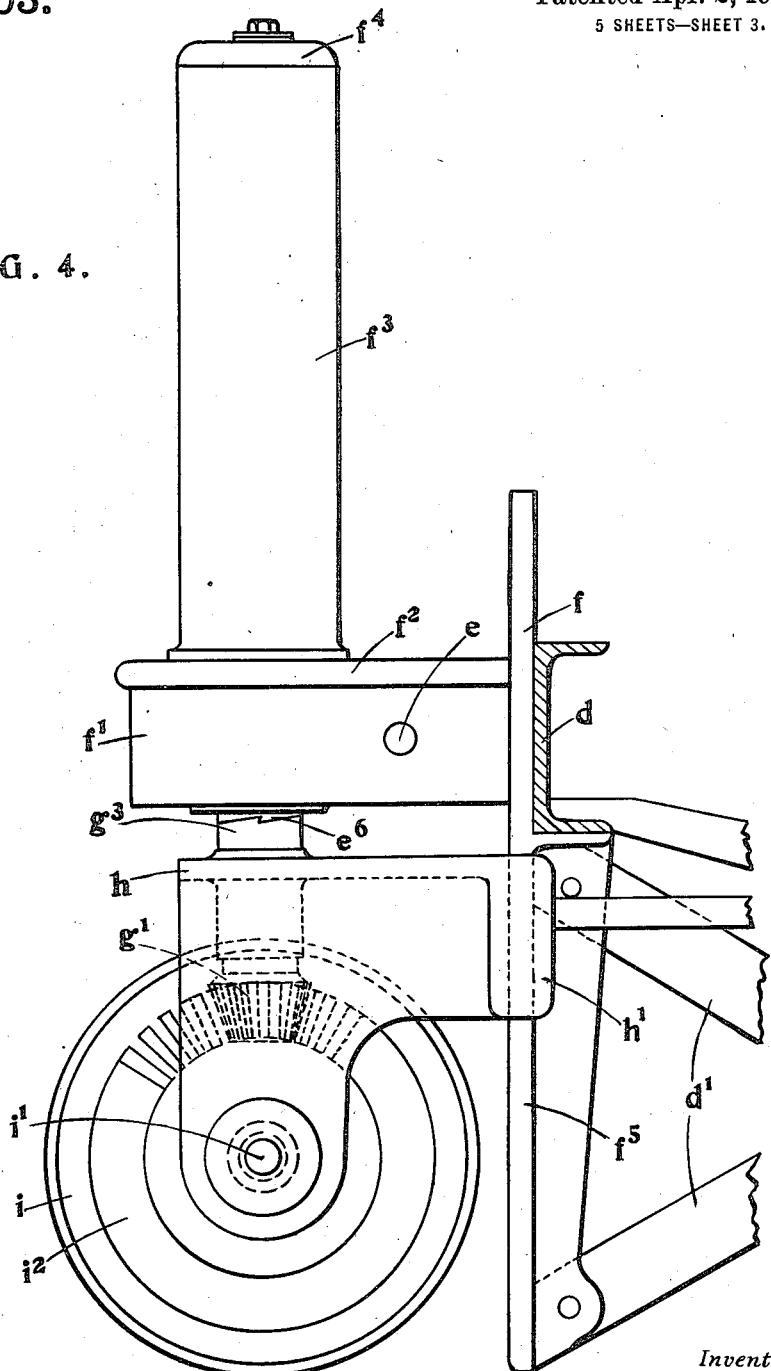

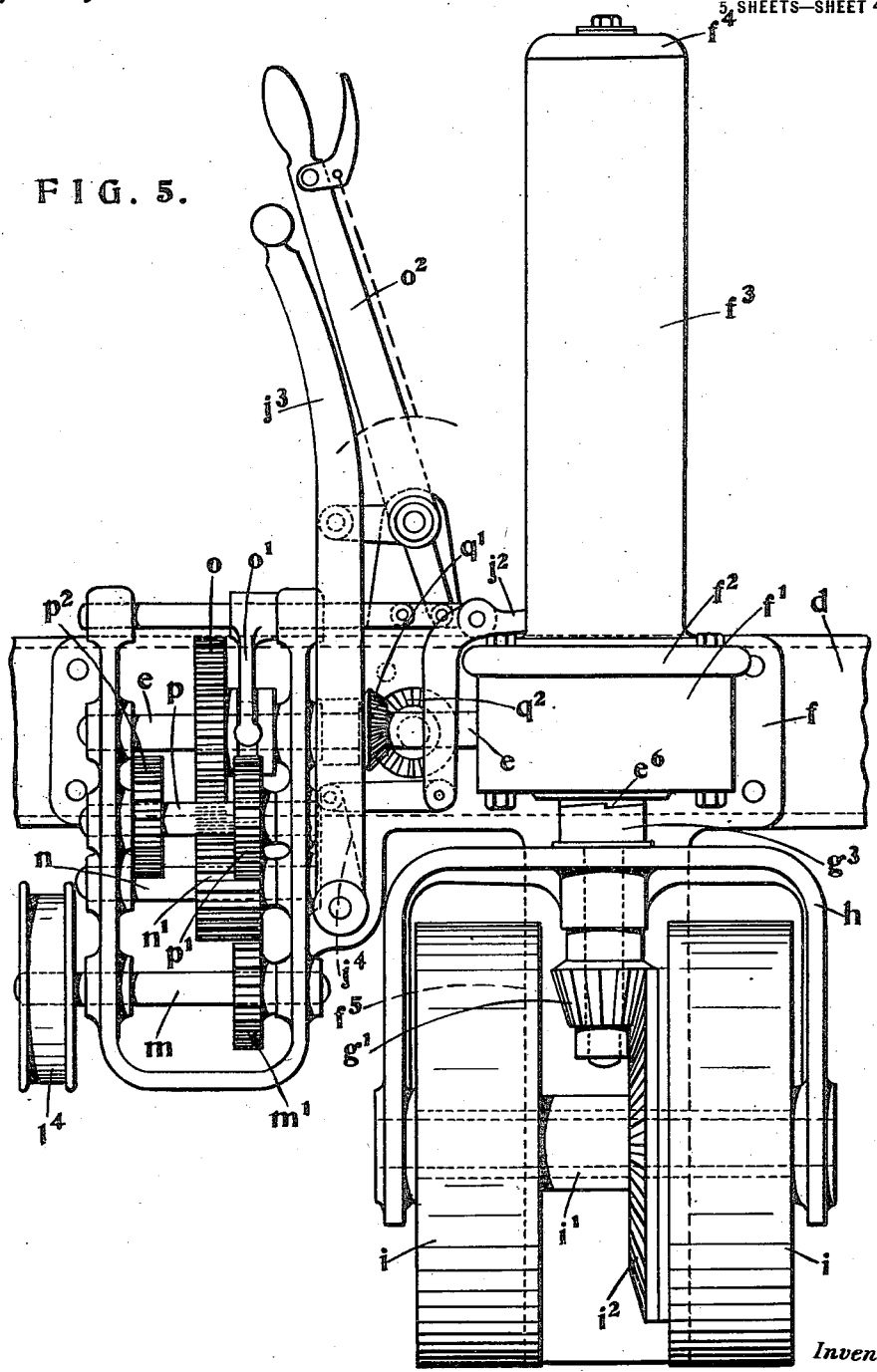

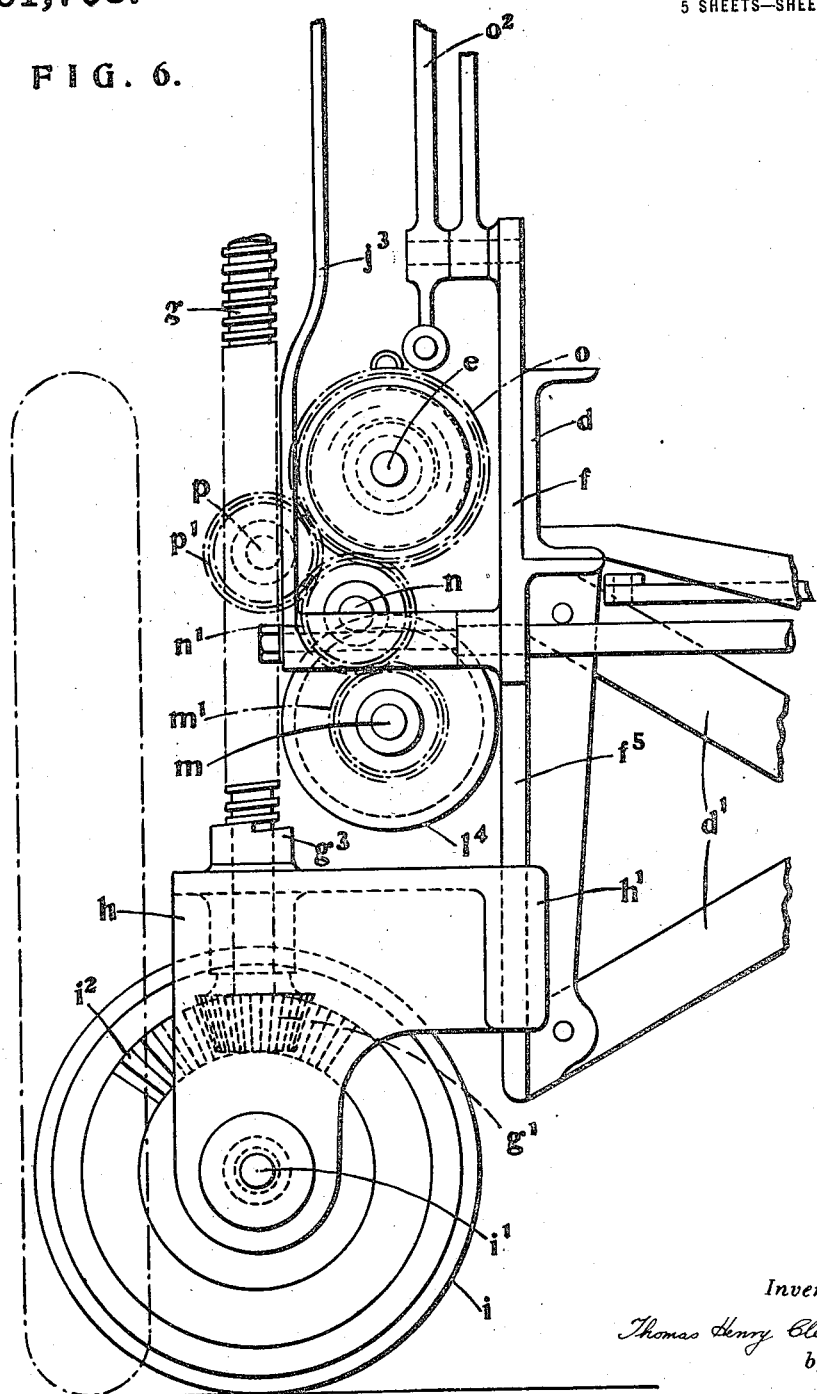

UNITED STATES PATENT OFFICE.

THOMAS HENRY CLEATHERO, OF WEST TILBURY, ENGLAND, ASSIGNOR OF ONE-HALF TO FRANK SPURR, OF GRAYS, ESSEX, ENGLAND.

VEHICLE JACK AND TURN-TABLE.

1,261,703.   Specification of Letters Patent.   Patented Apr. 2, 1918.

Application filed November 26, 1915. Serial No. 63,628.

*To all whom it may concern:*

Be it known that I, THOMAS HENRY CLEATHERO, a subject of the King of Great Britain and Ireland, residing at Mill House, West Tilbury, Essex, England, have invented a certain new and useful Vehicle Jack and Turn-Table, of which the following is a specification.

This invention relates to lifting and turning gear for use upon vehicles for the purpose of either raising the vehicle bodily from the ground or raising one end of the vehicle to permit the vehicle to be turned in a minimum space, and adapted to be fitted upon the vehicle and to be operated from a convenient point manually or from a suitable source of power, as for instance, from the motor in the case of a motor vehicle.

The invention relates particularly to a combined lifting and turning mechanism of the kind comprising a telescopic or two-part lifting jack carrying at the lower end a roller or other similar member arranged at a suitable angle to the longitudinal axis of the vehicle so that, one or more of such combined mechanisms being provided, the operation of the lifting jack or jacks serves first to lower the roller or rollers to the ground and then to raise the vehicle bodily or at one end to lift the road wheels or one pair of the road wheels from the ground, after which operation the vehicle is turned upon the roller or rollers about a central point or about the middle point of the axis of the road wheels which remain upon the ground. In such combined mechanisms the rotation of the roller or similar member for the turning of the vehicle is effected either manually or by power, and the control of the operation of the jack is effected from a convenient position such as the driver's seat.

The invention has for its objects to provide an improved construction of combined lifting and turning mechanisms and to provide improved means for operating the combined mechanisms.

According to the invention the mechanism is constructed in such manner that a single operating member serves automatically to effect the operation of the lifting jack for the purpose of lowering the roller or other similar member to the ground and raising the vehicle, and to rotate the roller for the turning of the vehicle.

The jack is conveniently of the kind comprising a threaded member housed within a suitable fixed outer casing and constrained from rotational movement and passing through a correspondingly threaded nut or operating member rotatably mounted in fixed position in the lower part of the casing and formed as a spur wheel, bevel wheel or worm wheel so that it may receive motion from a suitable driving member.

The application to motor vehicles of lifting and turning mechanism according to the invention is illustrated in the accompanying drawings in which—

Fig. 3 is a detail sectional elevation, to a larger scale, of one of the lifting and turning mechanisms;

Fig. 4 is a detail sectional elevation at right angles to Fig. 3 of the lifting and turning mechanism;

Fig. 5 is an end elevation of a lifting and turning mechanism provided with reversing gear, for application in the case of existing motor chassis;

Fig. 6 is a view in elevation taken at right angles to Fig. 5;

In carrying the invention into effect at each side of the chassis in a position adjacent to and to the rear of the front or steering wheels there is provided a power driven combined lifting jack and turning mechanism which will be hereinafter fully described. Referring to Figs. 1 to 4 of the accompanying drawings, which drawings relate to the application of the invention in the case of a chassis under construction, the power for the operation of the said mechanisms is transmitted from the driving shaft of the chassis by means of suitable shafting and bevel gear. For this purpose the driving shaft $a^1$ is separate from the driven shaft $a$ of the gear box and is adapted to be coupled thereto by a dog clutch $b$ slidably mounted on the said driven shaft. A gear wheel $a^2$ is loosely mounted on the driving shaft $a$ and is provided with a clutch member $b^1$ adapted for engagement with the dog clutch $b$ when the latter is in the neutral position and unclutched from the driving shaft. The gear wheel $a^2$ meshes with a second gear wheel $a^4$ carried upon a countershaft and the gear wheel $a^4$. At its extremities the transverse shaft $c$ carries bevel wheels $c^2$ adapted to mesh with bevel wheels $e^1$ mounted upon longitudinal shafts $e$ also carried in bearings in the angular bracket members $c^1$ and having the forward ends received in suitable bearings formed in the walls of the casing $f^1$ of the respective lifting and turning mechanisms.

Figure 1:
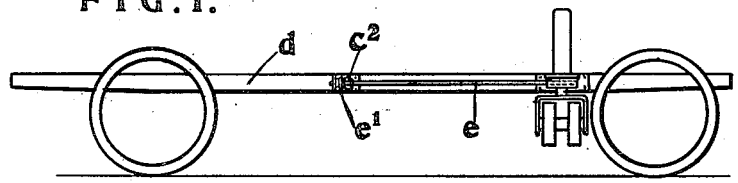
Figure 1 is a diagrammatic representation in side elevation of a motor chassis fitted with the lifting and turning gear according to the invention.
Figure 2:
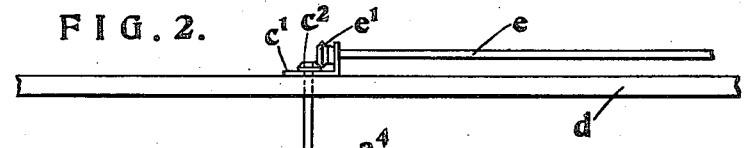
Fig. 2 is a diagrammatic representation in plan of a portion of the chassis, showing the means for the transmission of power from the change speed gear to the lifting and turning gear, to a larger scale.
Figure 8:
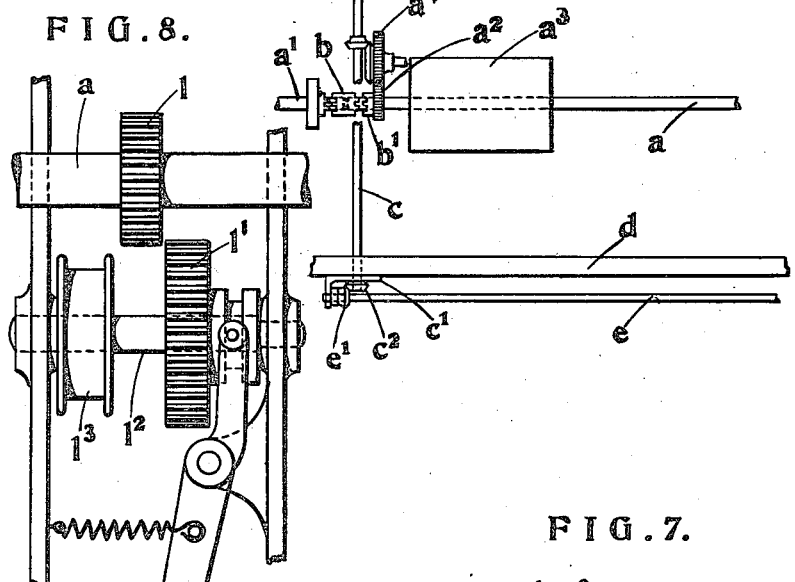
Fig. 8 is a detail plan view showing the means for effecting the drive from the motor shaft.
Figure 7:
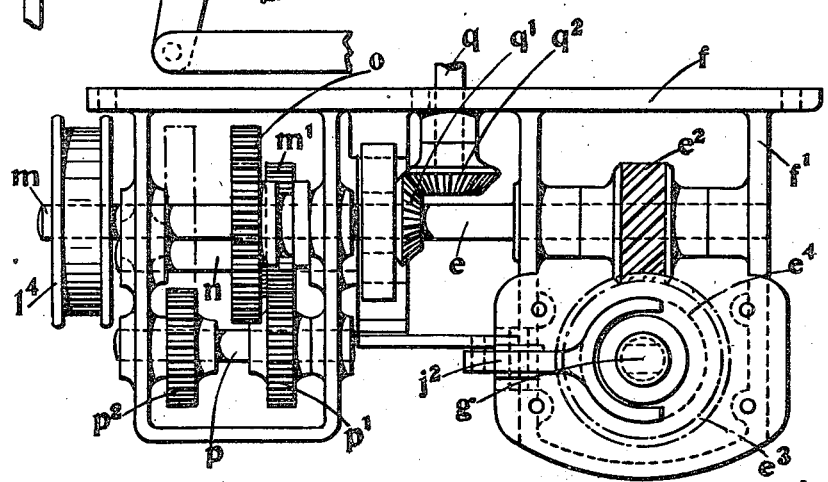
Fig. 7 is a plan view corresponding to Fig. 5.

Within the said casings $f^1$ the shafts $e$ are provided with worms $e^2$ (see Fig. 7) by which power is transmitted to worm wheels $e^3$ serving to effect the operation of the lifting and turning mechanism.

For each mechanism there is provided a carrier member or bracket $f$ adapted to be secured to the longitudinal frame member $d$ of the chassis. Each bracket is suitably strengthened by webs and the two brackets are tied together by cross-stays $d^1$ which may be suitably formed at the middle of their length for fixture to the under face of the engine casing to secure additional rigidity.

The brackets are provided with box-like worm gear casings $f^1$ integrally formed or secured thereto. The casings $f^1$ are provided with cover plates $f^2$ having central openings about which are provided or mounted upwardly extending casings $f^3$, adapted to receive the jack shafts $g$ when in the elevated position, such casings $f^3$ being closed by cover plates $f^4$.

In the bottom of the casing $f^1$ and in the cover plate $f^2$ there are formed bearings for the sleeve or hollow boss $e^4$ of the worm wheel, which sleeve extends upwardly and downwardly through the said bearings, while the worm wheel itself is carried in ball bearings or between hardened washers. The sleeve $e^4$ of the worm wheel $e^3$ is screw-threaded on the interior to engage with the exterior screw thread provided on the jack shaft $g$ as illustrated in Fig. 3 which projects through the sleeve of the worm wheel and has its lower portion unthreaded. At the lower extremity of the jack shaft there is secured a bevel wheel $g^1$. Immediately above the bevel wheel the jack shaft $g$ passes loosely through a boss $h^{11}$ formed on a forked bracket member $h$ serving to carry the shaft $i^1$ of a pair of road rollers $i$, one of which is provided with a bevel gear wheel $i^2$ adapted to engage the bevel wheel $g^1$. The bracket member $h$ has a lateral extension $h^1$ formed as a slide and adapted to engage a vertically disposed slideway $f^5$ formed on the downwardly extending portion of the bracket $f$, this arrangement serving always to maintain the forked bracket member in its determined relation to the chassis, with the planes of the road rollers $i$ transversely disposed with reference to the longitudinal axis of the chassis.

The upper and lower ends of the boss or sleeve $e^4$ of the worm wheel are formed as toothed clutches or ratchets $e^5$ $e^6$ respectively having the end faces inclined to the same pitch or inclination as the thread of the jack shaft $g$, while at the head of the shaft and toward the lower end, immediately above the boss of the forked bracket member $h$ or roller carrier there are secured corresponding clutch members $g^2$ $g^3$. The boss or sleeve $e^4$ of the worm wheel projects beyond the cover plate $f^2$ of the casing $f^1$ to a sufficient degree to permit the mounting thereon of a slidable sleeve $j$ carrying a feather $j^1$ by which relative rotation is prevented. The clutch member $g^2$ at the head of the jack shaft $g$ is formed with a key way $g^{21}$ in a corresponding position so that when the said clutch member $g^2$ is in engagement with the boss $e^4$ of the worm wheel it may be locked thereto by the partial movement of the sleeve $j$ over it to engage the feather $j^1$ in the key way. The movement of the sleeve $j$ is effected by a forked bell-crank lever $j^2$ which engages with a peripheral groove in the sleeve and is operated from a hand lever $j^3$ pivoted upon the bracket $f$ and acting through a co-axial arm $j^4$ and a link.

To prevent rotation of the jack shaft $g$ while it is being lowered or raised the clutch member $g^2$ at its head is provided with a lug or projection $g^4$ adapted to bear against a feather or key $f^6$ extending along the wall of the casing $f^3$. In order, however, that the shaft $g$ may be free to rotate when in its upper and lower positions the feather or key $f^6$ is of a length to provide a space at each end sufficient to permit the free passage of the lug or projection $g^4$. As it is not required that the shaft $g$ should rotate in its upper position when it is desired to lower the jack, there is provided on the cover plate $f^4$ of the casing $f^3$ a clutch device comprising a disk $k$ with one way clutch teeth on its lower face and a squared boss $k^1$ on or in its upper face adapted to engage a squared recess $k^2$ provided in or on the cover plate. A spiral spring $k^3$ or the like is mounted between the disk and the cover plate. Such clutch device is adapted to engage corresponding clutch teeth provided on the clutch member $g^2$ of the jack shaft $g$. While such a device is effective to hold the shaft $g$ against rotation in one direction when being lowered until the lug or projection $g^4$ falls sufficiently to engage the feather or key $f^6$, it permits rotation of the shaft in the opposite direction when rising to the upper position by the movement of the clutch teeth over each other and the resiliency of the mounting of the disk $k$.

In the operation of the mechanism according to the invention, when it is desired to turn the chassis in a particular direction, the speed gear is brought to the low speed or a suitable ratio and the dog clutch $b$ coupling the driving shaft to the gear box is withdrawn by the operation of the hand lever and engaged with the gear wheel $a^2$ serving for the operation of the transverse shaft $c$. The worm wheels $e^3$ on the two jack shafts $g$ are thus rotated. By reason of the engagement of the clutch member $g^2$ at the head of the jack shaft with the clutch disk $k$ upon the cover plate $f^4$ the jack shaft $g$ is prevented from rotating and is therefore moved longitudinally in the downward direction. Before the clutch member $g^2$ at the head of the shaft is released the lug or projection $g^4$ thereon contacts with the feather $f^6$ of the casing $f^3$ and thus the jack shaft $g$ is maintained against rotation until it has moved downwardly a sufficient distance to permit the lug or projection $g^4$ to leave the feather $f^6$ and also to permit the engagement of the clutch member $g^2$ with the clutch face $e^5$ at the upper end of the sleeve of the worm wheel. In the downward movement of the jack shaft $g$ it will be observed that the forked bracket member $h$ and the road rollers $i$ will also move downwardly until the road rollers rest upon the ground, when the continued downward movement of the jack shaft serves to raise the forward portion of the chassis and to lift the front road wheels from the ground. When the jack shaft has reached its lowest position and the clutch member $g^2$ has engaged with the sleeve of the worm wheel, the shaft $g$ rotates with the worm wheel with the result that the road rollers $i$ are driven by means of the bevel gear $g^1$ $i^2$ and the chassis revolves about the middle point of the back axle.

If it is now desired to turn the chassis in the opposite direction it is necessary first to operate the hand lever $j^3$ by which the slidable sleeve $j$ upon the upper portion of the sleeve $e^4$ of the worm wheel may be moved upwardly to engage the clutch member $g^2$ at the head of the jack shaft $g$. This is necessary because in the reverse rotation of the worm wheel $e^3$ the clutch members $g^2$ $e^5$ would tend to separate and the jack shaft $g$ would rise instead of rotating. It is therefore necessary to lock the clutch members together. The reverse rotation is effected by the use of the reverse gearing of the motor chassis.

When it is desired that the front portion of the chassis should be lowered and the road rollers $i$ and jack shaft $g$ returned to the lifted position, it is merely necessary to effect reverse rotation of the worm wheel $e^3$ without engaging the sleeve member $j$ with the clutch member $g^2$. The non-rotation of the jack shaft $g$ under these conditions serves to permit it to move upwardly and thus to engage the lug or projection $g^4$ of the clutch member $g^2$ with the key or feather $f^6$ of the casing $f^3$, when the continued rotation of the worm wheel causes the upward movement of the jack shaft to the lifted position.

The provision of the clutch member $g^3$ on the lower portion of the jack shaft $g$ for engagement with the clutch face $e^6$ at the lower end of the sleeve of the worm wheel serves to prevent the continued upward movement of the jack shaft after it has risen to its upper position, as the clutch members $g^3$, $e^6$ become engaged and thus the shaft $g$ is locked to the worm wheel $e^3$ and merely rotates instead of moving longitudinally, the only result of this rotation being that the road rollers $i$ are rotated.

In the case where the invention is applied to an existing motor chassis and it is not desired to employ the dog clutch $b$ and transverse shaft drive, the shaft $e$ of the lifting and turning jack may receive the drive from the driving shaft $a$ through chain wheels or other gear, by way of a reversing gear suitably provided in a casing adjacent to the worm and worm wheel casing of one of the jacks and conveniently mounted on the same bracket $h$. For this purpose as illustrated in the Figs. 5 to 8 of the accompanying drawings, there is provided a spur wheel $l$ upon the driving shaft $a$ adapted for engagement with a second spur wheel $l^1$ slidably mounted upon a countershaft $l^2$ and under the control of a suitable operating lever and link-work. The countershaft has fixedly mounted upon it a pulley $l^3$ adapted to drive a pulley $l^4$ provided upon the first shaft $m$ of the reversing gear. Within the gear box the shaft $m$ has fixedly mounted upon it a spur wheel $m^1$ adapted to engage a double width spur wheel $n^1$ mounted upon a countershaft $n$. This spur wheel serves to drive the worm shaft $e$ of the adjacent jack by means of a spur wheel $o$ slidably mounted thereon and adapted to be traversed along the shaft by means of a fork $o^1$ under the control of a suitable hand lever $o^2$. In order that the reverse movement may be secured an additional countershaft $p$ is provided carrying two spur wheels $p^1$ $p^2$ of the same diameter, one at each end, and such shaft is mounted in a position such that the wheel $p^1$ engages the double width spur wheel $n^1$ while the wheel $p^2$ is in a position to be engaged by the slidable spur wheel $o$ on the worm wheel shaft $e$ when the said wheel is traversed out of engagement with the double width spur wheel $n^1$.

For the operation of the worm wheel of the mechanism at the farther side of the chassis, there is provided upon the worm shaft a bevel wheel $q^1$ meshing with a bevel wheel $q^2$ at the extremity of a transverse shaft $q$ which, in a similar manner, through bevel gear, operates the worm shaft of the second mechanism. The construction and operation of the lifting and turning mechanism in this application of the invention is precisely the same as that hereinbefore described.

It will be understood that the invention is not limited to the actual details of construction hereinbefore described as these may obviously be varied without departing from the spirit of the invention.

I claim:—

1. A vehicle jack and turntable, comprising a lifting jack having at its lower end rolling contact members, means including a single operating member for lowering the said lifting jack and thereby raising the vehicle, and means operating automatically on the said lifting jack assuming its lowest position, for rotating the said rolling contact members for turning the vehicle, substantially as described.

2. A vehicle jack and turntable, comprising a screw jack having at its lower end rolling contact members, means for operating the said jack for lowering it and thereby raising the vehicle and for rotating the rolling contact members, comprising a single operating member, said screw jack being provided with a clutch member at the head of its threaded part for engagement in the lowest position with a clutch part on the operating member, substantially as described.

3. A vehicle jack and turntable, comprising a screw jack having at its lower end rolling contact members, means for operating the said jack for lowering it and thereby raising the vehicle and for rotating the rolling contact members, comprising a single operating member, said screw jack being provided with a clutch member at the head of its threaded part for engagement in the lowest position with a clutch part on the operating member, and means for locking the respective clutch members or parts together in the engaged position, substantially as described.

4. A vehicle jack and turntable, comprising a screw jack having at its lower end rolling contact members, means for operating the said jack for lowering it and thereby raising the vehicle and for rotating the rolling contact members, comprising a single operating member, said screw jack having a clutch part at the lower end for engagement in the upper position with another clutch part on the said operating member, substantially as described.

5. A vehicle jack and turntable, comprising a lifting jack having at its lower end rolling contact members, means for lowering the said lifting jack and thereby raising the vehicle and means for rotating the said rolling contact members for turning the vehicle, comprising a single common operating member, and means to permit rotation of the threaded part of the screw jack when in its upper position in one direction only, substantially as described.

6. A vehicle jack and turntable, comprising a lifting jack having at its lower end rolling contact members, means for lowering the said lifting jack and thereby raising the vehicle and means for rotating the said rolling contact members for turning the vehicle, comprising a single common operating member, and means for transmitting motion at will from the driven shaft of a speed gear for the rotation in either direction of the said operating member, substantially as described.

7. A vehicle jack and turntable, comprising a lifting jack having at its lower end rolling contact members, means for lowering the said lifting jack and thereby raising the vehicle and means for rotating the said rolling contact members for turning the vehicle, comprising a single common operating member, and means for transmitting motion at will from the motor shaft for the rotation in either direction of the said operating member, substantially as described.

8. A vehicle jack and turntable, comprising a lifting jack having at its lower end rolling contact members, means for lowering the said lifting jack and thereby raising the vehicle and means for rotating the said rolling contact members for turning the vehicle, comprising a single common operating member, and means for transmitting motion at will from the motor shaft for the rotation in either direction of the said operating member, and a reversing gear, substantially as described.

THOMAS HENRY CLEATHERO.

Witnesses:
WILLIAM EDWARD COONEY,
SAMUEL GREENBERG.